US008670807B2

(12) United States Patent
Rose et al.

(10) Patent No.: US 8,670,807 B2
(45) Date of Patent: Mar. 11, 2014

(54) SYSTEMS, METHODS, AND APPARATUS FOR CONTROLLING THE ELEMENTS OF SUPERCONDUCTING PROCESSORS

(75) Inventors: Geordie Rose, Vancouver (CA); Paul I. Bunyk, Vancouver (CA)

(73) Assignee: D-Wave Systems Inc., Burnaby (CA)

(*) Notice: Subject to any disclaimer, the term of this patent is extended or adjusted under 35 U.S.C. 154(b) by 1605 days.

(21) Appl. No.: 12/193,601

(22) Filed: Aug. 18, 2008

(65) Prior Publication Data
US 2009/0075825 A1    Mar. 19, 2009

Related U.S. Application Data

(60) Provisional application No. 60/957,127, filed on Aug. 21, 2007.

(51) Int. Cl.
*H01L 39/22* (2006.01)
*H01L 39/02* (2006.01)
*G06N 99/00* (2010.01)

(52) U.S. Cl.
USPC ............... 505/170; 505/190; 326/4; 712/37; 709/238

(58) Field of Classification Search
USPC ......... 505/170, 190, 817, 831, 832, 858, 861, 505/865; 706/42, 75; 326/1–7; 365/129, 365/106, 160, 162; 712/37; 709/238
See application file for complete search history.

(56) References Cited

U.S. PATENT DOCUMENTS

| | | | |
|---|---|---|---|
| 5,365,476 A * | 11/1994 | Mukhanov | 365/162 |
| 6,012,140 A | 1/2000 | Thomason | 712/226 |
| 6,775,304 B1 * | 8/2004 | Ngo | 370/532 |
| 6,838,694 B2 | 1/2005 | Esteve et al. | 257/34 |
| 7,335,909 B2 | 2/2008 | Amin et al. | 257/34 |
| 7,843,209 B2 | 11/2010 | Berkley | 326/7 |
| 2002/0105948 A1* | 8/2002 | Glomb | 370/369 |
| 2006/0101236 A1 | 5/2006 | Han | 712/34 |
| 2006/0147154 A1 | 7/2006 | Thom et al. | 385/37 |
| 2006/0225165 A1 | 10/2006 | Maassen van den Brink et al. | 977/933 |
| 2008/0176750 A1 | 7/2008 | Rose et al. | 505/170 |
| 2008/0215850 A1 | 9/2008 | Berkley et al. | 712/1 |
| 2008/0238531 A1 | 10/2008 | Harris | 327/528 |
| 2009/0082209 A1 | 3/2009 | Bunyk et al. | 505/190 |

FOREIGN PATENT DOCUMENTS

| | | |
|---|---|---|
| JP | 1187666 | 7/1989 |
| JP | 2002252601 | 9/2002 |

OTHER PUBLICATIONS

Berkley et al., "Systems, Methods, and Apparatus for Superconducting Magnetic Shielding," U.S. Appl. No. 60/981,763, filed Oct. 22, 2007, 35 pages.
Blatter et al., "Design aspects of superconducting-phase quantum bits," *Physical Review B* 63:174511-1-174511-9, 2001.

(Continued)

*Primary Examiner* — Stanley Silverman
*Assistant Examiner* — Kallambella Vijayakumar
(74) *Attorney, Agent, or Firm* — Seed IP Law Group PLLC

(57) ABSTRACT

A computer system employs a network that between a data programming system and one or more superconducting programmable devices of a superconducting processor chip. Routers on the network, such as first-, second- and third-stage routers direct communications with the superconducting programmable devices. A superconducting memory register may load data signals received from a first-stage router into corresponding superconducting programmable devices. The system may employ additional superconducting chips, first-, second- or third-stage routers.

23 Claims, 4 Drawing Sheets

(56) References Cited

OTHER PUBLICATIONS

Bunyk et al., "RSFQ Subsystem for Petaflops-Scale Computing: 'COOL-0'," Proc. 3rd Petaflop Workshop, Annapolis, Maryland, Feb. 1999, 7 pages.

Choi, V., "Systems, Devices, and Methods for Analog Processing," U.S. Appl. No. 60/986,554, filed Nov. 8, 2007, 39 pages.

Farhi et al., "Quantum Adiabatic Evolution Algorithms versus Simulated Annealing," MIT-CTP #3228, arXiv:quant-ph/0201031 v1, pp. 1-16, Jan. 8, 2002.

Feynman, "Simulating Physics with Computers," *International Journal of Theoretical Physics* 21(6/7):467-488, 1982.

Friedman et al., "Quantum superposition of distinct macroscopic states," *Nature* 406:43-46, Jul. 6, 2000.

Hosoya et al., "Superconducting Packet Switch," IEEE Transactions on Applied Superconductivity 5(2):3316-3319, 1995.

Il'ichev et al., "Continuous Monitoring of Rabi Oscillations in a Josephson Flux Qubit," *Physical Review Letters* 91(9):097906-1-097906-4, week ending Aug. 29, 2003.

International Search Report, mailed Nov. 20, 2008, for PCT/CA2008/001500, 3 pages.

Maibaum et al., "Systems, Devices, and Methods for Analog Processing," U.S. Appl. No. 61/039,710, filed Mar. 26, 2008, 48 pages.

Maibaum et al., "Systems, Methods and Apparatus for Superconducting Demultiplexer Circuits," U.S. Appl. No. 61/058,494, filed Jun. 3, 2008, 66 pages.

Makhlin et al., "Quantum-State Engineering with Josephson-Junction Devices," *Reviews of Modern Physics* 73(2):357-400, Apr. 2001.

Mooij et al., "Josephson Persistent-Current Qubit," *Science* 285:1036-1039, Aug. 13, 1999.

Nielsen et al., *Quantum Computation and Quantum Information*, Cambridge University Press, Cambridge, 2000, "7.8 Other implementation schemes," pp. 343-345.

Orlando et al., "Superconducting Persistent-Current Qubit," *Physical Review B* 60(22):15 398-15 413, Dec. 1, 1999.

Pobell, Matter and Methods at Low Temperatures, Springer-Verlag, Second Edition, 120-156, 1996.

Rose et al., "Systems, Methods, and Apparatus for Programming the Elements of Superconducting Processors," U.S. Appl. No. 60/957,127, filed Aug. 21, 2007, 50 pages.

Shor, "Introduction to Quantum Algorithms," AT&T Labs—Research, arXiv:quant-ph/0005003 v2, pp. 1-17, Jul. 6, 2001.

Thom et al., "Input/Output System and Devices for Use With Superconducting Devices," U.S. Appl. No. 12/016,801, filed Jan. 18, 2008, 132 pages.

Thom et al., "Systems, Methods, and Apparatus for Differential Electrical Filters," U.S. Appl. No. 61/080,997, filed Jul. 15, 2008, 76 pages.

Uchaykin et al., "Magnetic Vacuum Systems and Devices for Use With Superconducting Based Computing Systems," U.S. Appl. No. 61/025,243, filed Jan. 31, 2008, 36 pages.

Uchaykin et al., "Systems, Methods, and Apparatus for Combined Superconducting Magentic Shielding and Radiation Shielding," U.S. Appl. No. 60/984,321, filed Oct. 31, 2007, 35 pages.

Written Opinion, mailed Nov. 20, 2008, for PCT/CA2008/001500, 5 pages.

\* cited by examiner

SYSTEMS, METHODS, AND APPARATUS FOR CONTROLLING THE ELEMENTS OF SUPERCONDUCTING PROCESSORS

CROSS REFERENCE TO RELATED APPLICATIONS

This application claims benefit under 35 U.S.C. 119(e) of U.S. Provisional Patent Application Ser. No. 60/957,127, filed Aug. 21, 2007, entitled "Systems, Methods and Apparatus for Programming the Elements of Superconducting Processors", which is incorporated herein by reference in its entirety.

BACKGROUND

1. Field

The present systems, methods, and apparatus generally relate to computer systems that include at least one superconducting processor and particularly relate to network protocols for the controlling of configurations of multiple superconducting processors.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Simulated Annealing" arXiv.org:quant-ph/0201031 (2002), pp 1-16.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device. Examples of qubits include quantum particles, atoms, electrons, photons, ions, and the like.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar in some respects to those used for conventional integrated circuits.

Superconducting qubits are a type of superconducting device that can be included in a superconducting integrated circuit. Typical superconducting qubits, for example, have the advantage of scalability and are generally classified depending on the physical properties used to encode information including, for example, charge and phase devices, phase or flux devices, hybrid devices, and the like. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. Nos. 6,838,694 and 7,335,909.

Examples of flux qubits that may be used include rf-SQUIDs, which include a superconducting loop interrupted by one Josephson junction, or a compound junction (where a single Josephson junction is replaced by two parallel Josephson junctions), or persistent current qubits, which include a superconducting loop interrupted by three Josephson junctions, and the like. See e.g., Mooij et al., 1999, *Science* 285, 1036; and Orlando et al., 1999, *Phys. Rev. B* 60, 15398. Other examples of superconducting qubits can be found, for example, in Il'ichev et al., 2003, *Phys. Rev. Lett.* 91, 097906; Blatter et al., 2001, *Phys. Rev. B* 63, 174511, and Friedman et al., 2000, *Nature* 406, 43. In addition, hybrid charge-phase qubits may also be used.

The qubits may include a corresponding local bias device. The local bias devices may include a metal loop in proximity to a superconducting qubit that provides an external flux bias to the qubit. The local bias device may also include a plurality of Josephson junctions. Each superconducting qubit in the quantum processor may have a corresponding local bias device or there may be fewer local bias devices than qubits. In some embodiments, charge-based readout and local bias devices may be used. The readout device(s) may include a plurality of dc-SQUID magnetometers, each inductively connected to a different qubit within a topology. The readout device may provide a voltage or current. The dc-SQUID magnetometers including a loop of superconducting material interrupted by at least one Josephson junction are well known in the art.

Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems, methods, and apparatus are described in US Patent Publication No. 2006-0225165, U.S. patent application Ser. No. 12/013,192, U.S. Provisional Patent Application Ser. No. 60/986,554 filed Nov. 8, 2007 and entitled "Systems, Devices and Methods for Analog Processing," and U.S. Provisional Patent Application Ser. No. 61/039,710, filed Mar. 26, 2008 and entitled "Systems, Devices, And Methods For Analog Processing."

A superconducting quantum processor may include a number of coupling devices operable to selectively couple respective pairs of qubits. Examples of superconducting coupling devices include rf-SQUIDs and dc-SQUIDs, which couple qubits together by flux. SQUIDs include a superconducting loop interrupted by one Josephson junction (an rf-SQUID) or two Josephson junctions (a dc-SQUID). The coupling devices may be capable of both ferromagnetic and anti-ferromagnetic coupling, depending on how the coupling device is being utilized within the interconnected topology. In the case of flux coupling, ferromagnetic coupling implies that parallel fluxes are energetically favorable and anti-ferromagnetic coupling implies that anti-parallel fluxes are energetically favorable. Alternatively, charge-based coupling devices may also be used. Other coupling devices can be found, for example, in US Patent Publication No. 2006-0147154 and U.S. patent application Ser. No. 12/017,995. Respective coupling strengths of the coupling devices may be tuned between zero and a maximum value, for example, to provide ferromagnetic or anti-ferromagnetic coupling between qubits.

Superconducting Processor

A computer processor may take the form of a superconducting processor, where the superconducting processor may not be a quantum processor in the traditional sense. For instance, some embodiments of a superconducting processor may not focus on quantum effects such as quantum tunneling, superposition, and entanglement but may rather operate by emphasizing different principles, such as for example the principles that govern the operation of classical computer processors. However, there may still be certain advantages to the implementation of such superconducting processors. Due to their natural physical properties, superconducting processors in general may be capable of higher switching speeds and shorter computation times than non-superconducting processors, and therefore it may be more practical to solve certain problems on superconducting processors.

Refrigeration

According to the present state of the art, a superconducting material may generally act as a superconductor if it is cooled below a critical temperature that is characteristic of the specific material in question. For this reason, those of skill in the art will appreciate that a computer system that implements superconducting processors may implicitly include a refrigeration system for cooling the superconducting materials in the system. Systems and methods for such refrigeration systems are well known in the art. A dilution refrigerator is an example of a refrigeration system that is commonly implemented for cooling a superconducting material to a temperature at which it may act as a superconductor. In common practice, the cooling process in a dilution refrigerator may use a mixture of at least two isotopes of helium (such as helium-3 and helium-4). Full details on the operation of typical dilution refrigerators may be found in F. Pobell, *Matter and Methods at Low Temperatures*, Springer-Verlag Second Edition, 1996, pp. 120-156. However, for the present systems, methods and apparatus it is worthwhile to highlight two aspects of standard dilution refrigerators. First, standard dilution refrigerators are generally operated inside at least one cylindrical dewar. This is because the helium mixtures used in the dilution refrigerator may be highly pressurized and cylindrical containers are generally regarded as being the preferred geometry for the storage of contents under pressure. Second, the mechanism by which cooling power is transferred in a dilution refrigerator is typically through physical contact between materials. The devices inside a dilution refrigerator are typically maintained in a vacuum environment where the most significant form of thermal transfer is through physical contact with other devices in the system. A consequence of this is that a "thermal path" to and from the devices inside a dilution refrigerator often needs to be established. However, those of skill in the art will appreciate that the present systems, methods and apparatus are not limited to applications involving dilution refrigerators, but rather may be applied using any type of refrigeration system.

BRIEF SUMMARY

At least one embodiment may be summarized as computer system comprising a first superconducting processor chip that includes a first set of superconducting programmable devices; a data programming system for establishing data signals wherein a data signal includes programming information for at least one superconducting programmable device and routing information that identifies where the data signal is to be sent; a communication network that establishes a communication path between the data programming system and at least one of the superconducting programmable device; and a first first-stage router that interrupts the communication path between the data programming system and at least one superconducting programmable device in the first set of superconducting programmable devices.

The superconducting processor chip may include a superconducting quantum processor where at least one of the superconducting programmable devices is selected from the group consisting of: superconducting flux qubits, superconducting phase qubits, superconducting charge qubits, superconducting hybrid qubits, superconducting memory registers, single flux quantum shift registers, quantum flux parametron devices, and superconducting coupling devices. The communication path between the first first-stage router and the at least one superconducting programmable device may be interrupted by a superconducting memory register which receives a data signal from the first first-stage router and loads the data signal into the corresponding superconducting programmable device. At least one superconducting memory register may take the form of a single flux quantum shift register, a flux-based shift register comprising latching qubits, and a classical quantum flux parametron shift register. The first first-stage router may take the form of a superconducting packet router. The first first-stage router is integrated on the first superconducting processor chip and communication paths between the first first-stage router and the first set of superconducting programmable devices are superconducting.

The computer system may further comprise a second superconducting processor chip that includes a second set of superconducting programmable devices; at least one additional communication path that establishes communication between the data programming system and at least one of the superconducting programmable device in the second set of superconducting programmable devices; and a second first-stage router that interrupts the communication path between the data programming system and the at least one superconducting programmable device in the second set of superconducting programmable devices.

Another embodiment may be summarized as a method of programming a superconducting programmable device in a computer system that comprises a plurality of superconducting programmable devices. The method may comprise establishing a data signal with programming information for programming the superconducting programmable device and routing information that identifies to which of the superconducting programmable device the data signal corresponds; transmitting the data signal through a communication network that includes a plurality of communication paths and at least one superconducting packet router; reading at least a portion of the routing information contained in the data signal; routing at least a portion of the data signal along the appropriate communication path towards the superconducting programmable device; and loading the programming information from the data signal into the superconducting programmable device.

At least one communication path in the communication network may include a succession of at least two superconducting packet routers such that there are at least two points in the communication path where the data signal is read and routed. Transmitting the data signal through a communication network may include transmitting the data signal in the form of an electrical signal through at least a portion of the communication network. Transmitting the data signal through a communication network may include transmitting the data signal in the form of a superconducting signal through at least a portion of the communication network. Transmitting the data signal through a communication network may include transmitting the data signal in the form of a digital optical signal through at least one fiber-optic cable through at least a portion of the communication network. The method may further comprise converting at least one digital optical signal into an electrical signal. Loading the programming information from the data signal into the superconducting programmable device may include loading the data signal into at least one superconducting memory register and programming the corresponding superconducting programmable device from the superconducting memory register.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION OF THE INVENTION

Figure 1:
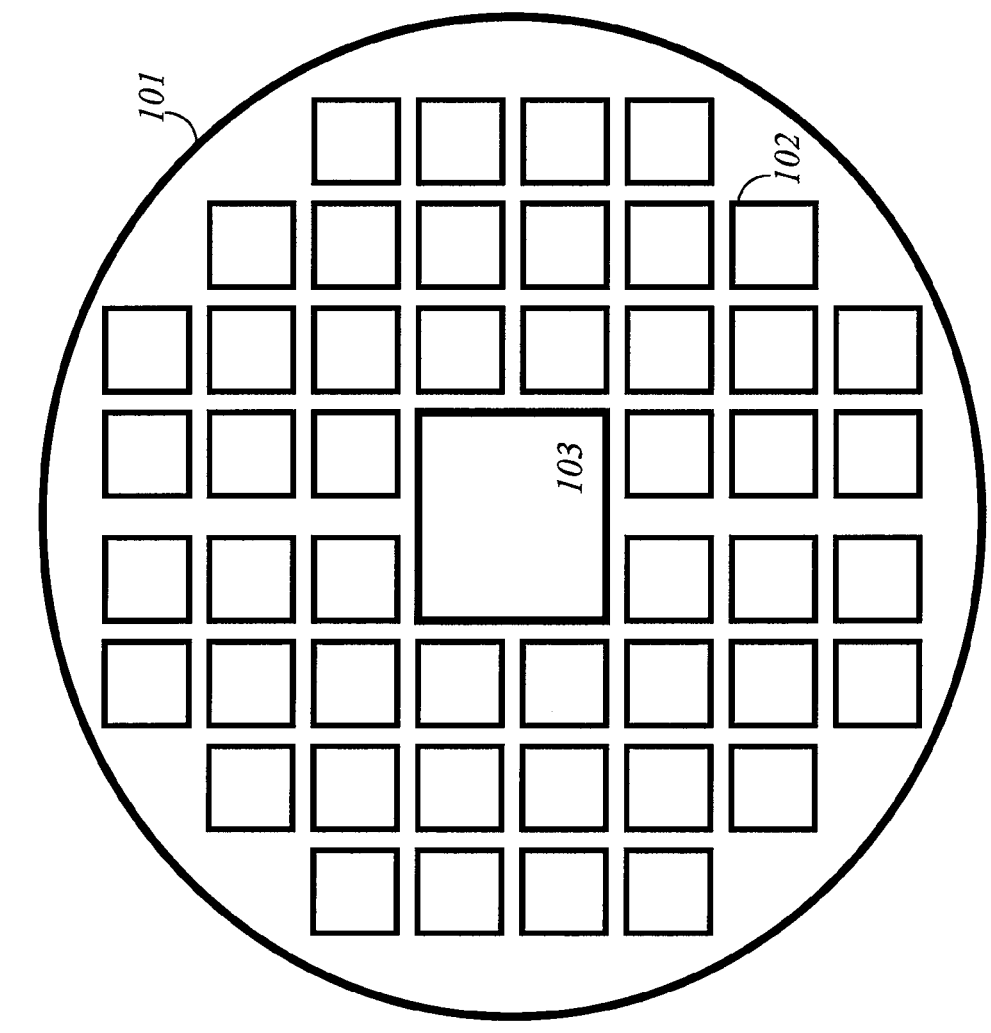
FIG. 1 is a top plan view of an embodiment of a single module that may be implemented in a modular multiple superconducting processor configuration.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with analog processors, such as quantum processors, quantum devices, coupling devices and control systems including microprocessors and drive circuitry have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The present systems, methods and apparatus describe a computer system that comprises at least one superconducting processor. In various embodiments, configurations of multiple superconducting processors are described that can be used to achieve high processor packing density within the confines of a refrigeration system, such as for example a system employing a dilution refrigerator. Furthermore, a method for programming a configuration of at least one superconducting processor using one or more superconducting packet routers is described.

Having access to multiple processors within a single machine may increase performance. In certain configurations, speed-ups increase linearly with the number of processors in the system. System configurations that implement only a single superconducting processor may therefore be limited in performance when compared to system configurations that implement multiple superconducting processors. A computer system that implements multiple superconducting processors may be operated in a variety of ways, including but not limited to: parallel processing of the same complete problem or task, parallel processing of different components (subproblems) resulting from the decomposition of a larger problem or task, and simultaneous processing of separate problems or tasks. The number of superconducting processors employed in a computer system that uses multiple superconducting processors may depend on the nature of the tasks to be performed. It may be advantageous for such a computer system to be modular in design, thereby allowing some flexibility in the number of superconducting processors implemented in the computer system. A modular system is one in which at least some components, such as the number of superconducting processors, may be varied without requiring major alterations to the other components of the system, such as the input/output wiring system, the refrigeration system, and/or the magnetic shielding system.

In accordance with the present state of the art, a superconducting material such as aluminum or niobium may behave as a superconductor when the material is cooled below its characteristic critical temperature. For this reason, a processor composed of known superconducting materials is typically cooled if it is to operate as a superconducting processor. It may therefore be advantageous for the design of a modular multiple superconducting processor configuration to account for the cooling process and for it to be compatible with the refrigeration system being used. Furthermore, a superconducting processor that manipulates magnetic flux signals may be highly sensitive to ambient magnetic fields. As such, it may also be advantageous for the design of a modular multiple superconducting processor configuration to be compatible with the magnetic shielding devices in the computer system. Examples of appropriate magnetic shielding systems and methods are fully described in U.S. Provisional Patent Application Ser. No. 61/025,243, filed Jan. 31, 2008, entitled "Magnetic Vacuum Systems and Devices for use with Superconducting Based Computing Systems", U.S. Provisional Patent Application Ser. No. 60/984,321, filed Oct. 31, 2007, entitled "Systems, Methods and Apparatus for Combined Superconducting Magnetic Shielding and Radiation Shielding", and U.S. Provisional Patent Application Ser. No. 60/981,763, filed Oct. 22, 2007 and entitled "Systems, Methods and Apparatus for Superconducting Magnetic Shielding."

A further aspect of a computer system that implements multiple superconducting processors is the programming of the respective superconducting processors. The present systems, methods and apparatus include a communication protocol for using superconducting packet routers to program the respective superconducting processors in a configuration of multiple superconducting processors. Those of skill in the relevant art will appreciate that the term "superconducting packet switch" is often used synonymously with the term "superconducting packet router." Thus, throughout this specification and the appended claims the term "superconducting packet router" is used to indicate a device that performs the functions that may also commonly be associated with superconducting packet switches. Superconducting packet routers (and similarly, superconducting packet switches) are devices that are well known in the art. More detail on their structure and operation may be found, for example, in Hosoya et al., 1995, *IEEE Transactions on Applied Superconductivity*, Volume 5, Issue 2, pp. 3316-3319 and US Patent Publication Number 2002-0105948. While superconducting packet routers themselves are well understood, the present systems, methods and apparatus describe a novel application of superconducting packet routers in the programming of multiple superconducting processors and/or multiple superconducting processor devices.

The embodiments of superconducting processor configurations described herein generally include arranging a plurality of superconducting processor chips on a base plate. Throughout this specification, superconducting processor chips are illustrated as being square in geometry because standard processor chips are typically square in geometry. However, those of skill in the relevant art will appreciate that the present systems, methods and apparatus may be applied using superconducting processor chips that are of a geometry other than square. Furthermore, in some embodiments a superconducting processor chip may include additional devices beyond those that constitute a superconducting processor. For instance, throughout this specification and the appended claims, a superconducting processor chip may comprise a single chip or it may comprise a multi-chip module (MCM) upon or within which multiple devices are integrated. In some embodiments, all or a portion of the superconducting chips in a configuration of multiple superconducting processors may be MCMs that include the superconducting processor components, as well as other devices such as but not limited to: memory registers, signal converters, and readout devices. A single superconducting processor MCM chip may include more than one superconducting processor.

As previously discussed, the present systems, methods and apparatus may be applied using any type of refrigeration system. Some embodiments may involve the use of a dilution refrigerator and/or a cryocooler, both of which are typically cylindrical in geometry. For this reason, it may be advantageous for a configuration of multiple superconducting processors to similarly assume a cylindrical or circular geometry. That is, the base plate upon which the multiple superconducting processor chips are arranged may be a circular base plate. Such geometrical compatibility may help to maximize the packing density of the multiple superconducting processors and the thermalization of the base plate. Throughout the remainder of this specification, the base plate upon which multiple superconducting processor chips are arranged is illustrated as being circular in geometry. However, those of skill in the art will appreciate that base plates of other geometries, such as square, hexagonal, or triangular, may similarly be implemented and may even be advantageous within refrigeration environments that can accommodate other structural geometries. Furthermore, the material and surface characteristics of the base plate upon which multiple superconducting processor chips are arranged may differ between embodiments of the present systems, methods and apparatus. For instance, in some embodiments the top surface of a base plate may be covered with a printed circuit board (PCB) that includes a network of superconductive traces for communicating with the superconducting processor chips that are arranged upon the base plate. In some embodiments, a base plate may be an MCM that integrates a plurality of chips and/or devices.

The present systems, methods and apparatus describe a modular design for configurations of multiple superconducting processors. In this design, multiple superconducting processor chips are arranged on at least one base plate. In some embodiments, a plurality of such base plates, each with its own respective arrangement of superconducting processor chips, may be assembled in, for example, a stack. The number of base plates in the system depends on the number of superconducting processor chips required by the customer or application. Each base plate may include a respective set of superconducting processor chips. Therefore, the modular addition of multiple base plates realizes a level of customization in the computing system that may influence its price and performance characteristics. In certain configurations, performance may increase linearly with the number of processors. Thus, in embodiments where each base plate includes the same number of superconducting processor chips, the performance of the system may double with each additional base plate incorporated into the system.

A further aspect of this design is a system for communicating with the individual superconducting processor chips present on each base plate. This communication system may include a network protocol using at least one superconducting packet router. Thus, at least one superconducting packet router may be used to communicate with a plurality of superconducting processor chips in a configuration of multiple superconducting processors. In some embodiments, a superconducting packet router may be used to communicate with multiple superconducting programmable devices on a single superconducting processor chip.

The present systems, methods and apparatus are compatible with the characteristics of most commercially available refrigeration systems, such as for example dilution refrigerator systems. As previously discussed, this compatibility may be improved by using a circular geometry for the modular base plates upon which the superconducting processor chips are arranged. FIG. 1 shows top plan view of an embodiment of a single module 100 that may be implemented in a modular configuration of multiple superconducting processors. The illustrated embodiment includes a circular base plate 101 upon which is arranged a plurality of square superconducting processor chips 102 (only one called out in the Figure). In the centre of the arrangement of superconducting processor chips is a superconducting packet router 103. As previously discussed, base plate 101 may be a multi-chip module (MCM) that integrates various devices (in this case, the router 103 and chips 102). The size of base plate 101 may vary depending on the characteristics of the refrigeration system and magnetic shielding systems being implemented. Similarly, the dimensions of the superconducting processor chips 102 may vary. Those of skill in the art will appreciate that any number of superconducting processor chips may be arranged on a base plate depending, in part, on the dimensions of the plate and processors. In the embodiment of FIG. 1, base plate 101 may have a diameter of 10 cm and the square superconducting processor chips may each have a side length of 1 cm. In such an embodiment, forty-eight square superconducting processor chips 102 may be arranged in a square grid on base plate 101. In another embodiment, base plate 101 may have a 20 cm diameter that accommodates a square grid of three hundred square superconducting processor chips each with side length of 1 cm. Those of skill in the art will also appreciate that the arrangement of superconducting processor chips upon a base plate may be different from a square grid. For instance, the superconducting processor chips 102 may be arranged in a spiral, or concentric circles, or any number of other arrangements to accommodate other system components and requirements.

The present systems, methods and apparatus are modular partly because the number of base plates, and therefore the number of superconducting processor chips, may be customized depending on the requirements of the system.

Figure 2:
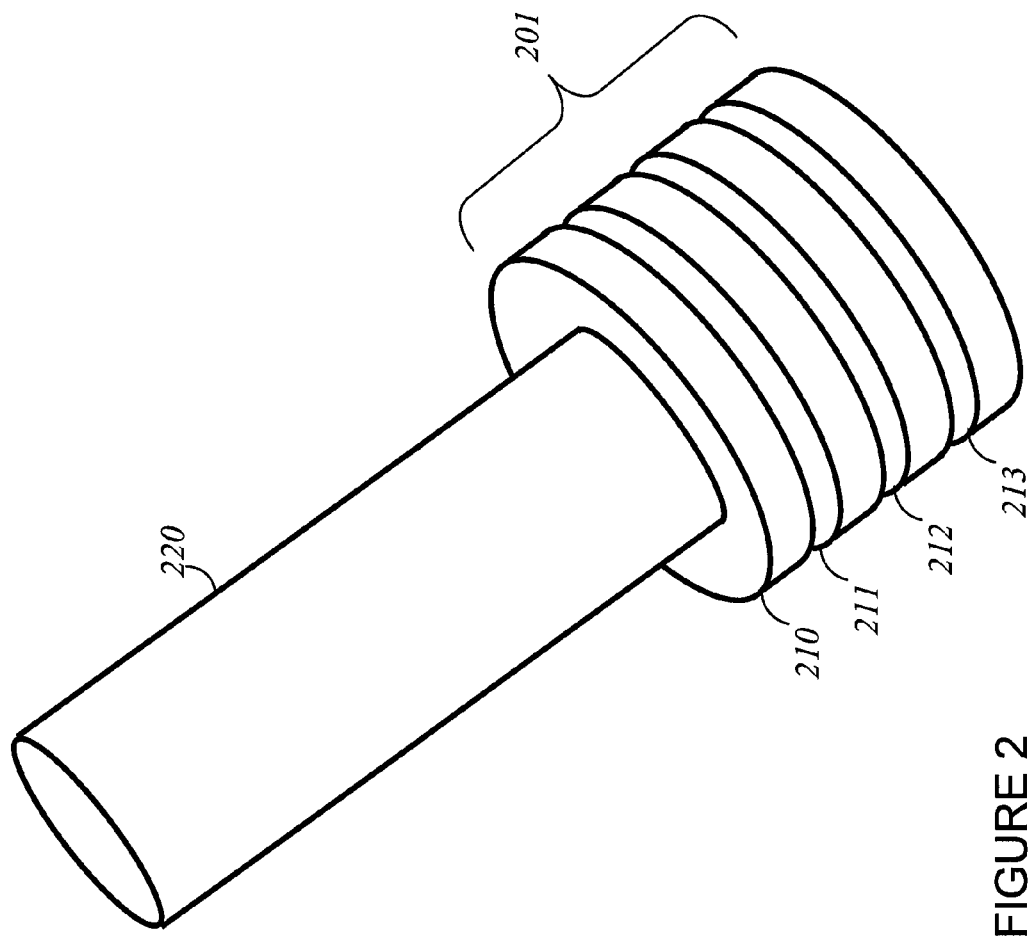
FIG. 2 is an isometric view of an embodiment of a modular multiple superconducting processor system that includes a stack of four modules.

FIG. 2 shows an embodiment of a modular multiple superconducting processor system 200 that includes a stack 201 of four modules 210-213. In the illustrated embodiment, each module 210-213 in stack 201 includes a circular base plate and each module 210-213 may be substantially similar to module 100 from FIG. 1. It can be advantageous to use circular geometry for modules 210-213 because a circular geometry may be more compatible with existing refrigeration system designs. For instance, system 200 includes a cold surface 220 in a refrigeration system, and cold surface 220 is itself of cylindrical geometry. Thus, circular base plates such as those illustrated in modules 210-213 (and base plate 101 from FIG. 1) may bolt onto and/or within a typical cylindrical refrigeration system, such as for example a dilution refrigerator, without much modification to stock configurations. Those of skill in the art will appreciate that, in the context of refrigeration systems, the term "bolt" is used to describe intentional physical contacts within the refrigeration system that serve as thermalization points that contribute to the removal of heat from within the refrigeration system. Thus, the term "bolt", when used herein in the context of refrigeration systems may be interpreted as "establish thermal contact with" and the physical implementation of actual bolts is but one exemplary structure by which such contacts may be established. Furthermore, in some embodiments cold surface 220 may be encased within a cylindrical dewar containing a refrigerant, such as liquid helium. In such embodiments, circular base plate geometries such as base plate 101 and modules 210-213 may allow for the greatest packing density of superconducting processor chips inside the confines of a cylindrical dewar.

As shown in FIG. 2, the individual modules 210-213 in modular system 200 may be stacked. In some embodiments, it may be necessary for such a stack to accommodate room for input/output wiring, magnetic shielding, and heat dissipation (not shown). Each module, such as modules 210-213 in FIG. 2, has an associated thickness and this thickness may be designed to accommodate the various other devices within the system. For instance, an exemplary embodiment of system 200 may use a stack 201 of thirty modules where each module may have a thickness of 1 cm, thus giving a cylinder with a height of 30 cm. In some embodiments, heat dissipation (thermalization) and magnetic shielding may be achieved at the level of the modules themselves and therefore systems such as heat dissipation and magnetic shielding may be modular as well. In some embodiments, heat dissipation is accomplished by non-superconductive thermal contacts between modules. Furthermore, some measure of magnetic shielding may be accomplished by encasing stack 201 in a metallic shield. Those of skill in the art will appreciate that the exact mechanisms by which heat dissipation and magnetic shielding are realized may be highly dependent on the requirements of the system in which system 200 is being implemented.

The present systems, methods and apparatus describe a communication protocol for using superconducting packet routers to program the respective superconducting processors in a configuration of multiple superconducting processors. In some embodiments, the communication protocol involves a multi-stage network with at least one superconducting packet router acting as the intermediary between each stage.

Figure 3:
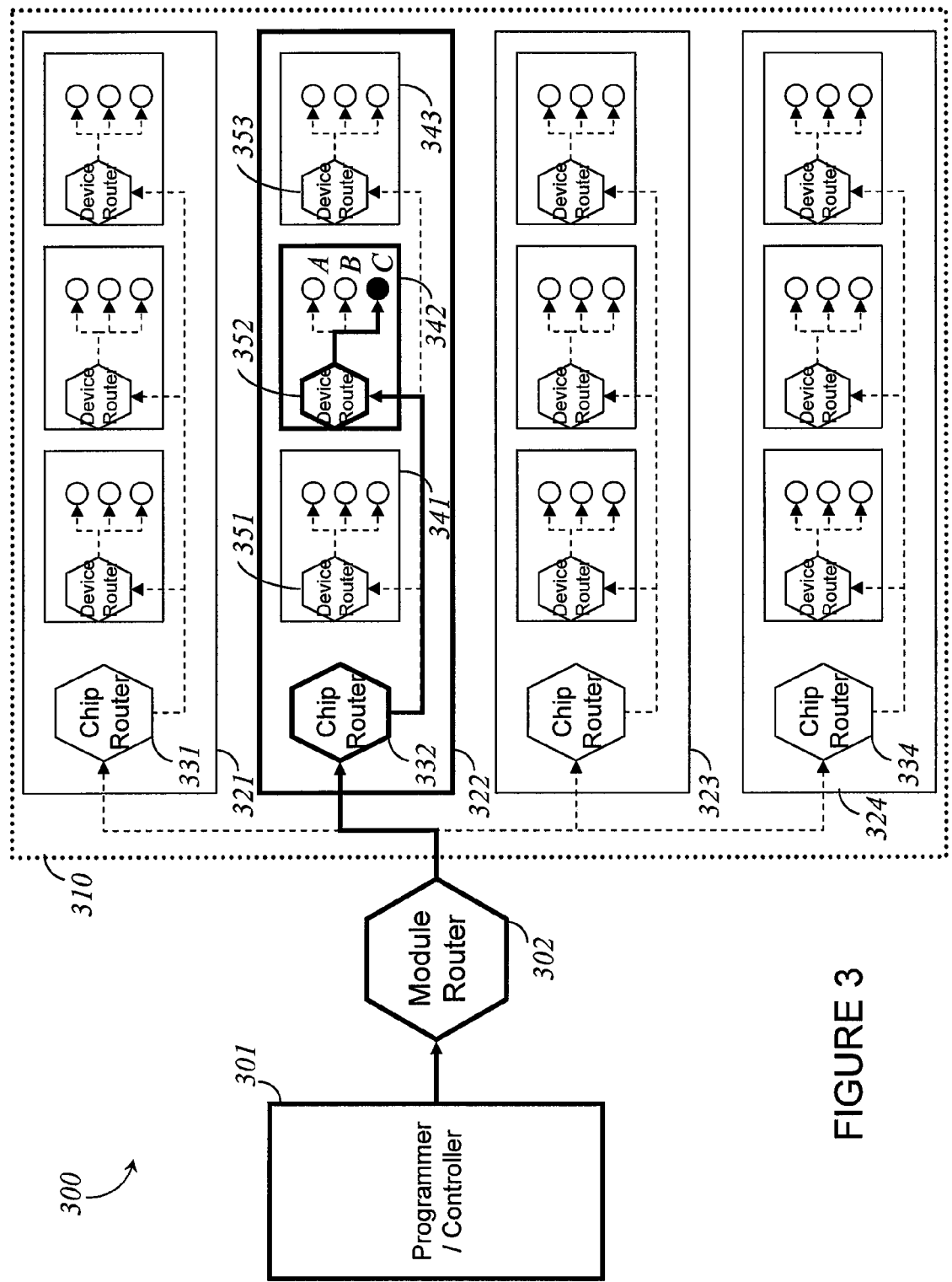
FIG. 3 is a schematic diagram of an embodiment of a multiple superconducting processor system that uses superconducting packet routers to program the respective superconducting processors.

FIG. 3 shows an embodiment of a multiple superconducting processor system 300 that uses superconducting packet routers to program the respective superconducting processors. System 300 includes a stack 310, of four modules 321-324. Those of skill in the art will appreciate that stack 310 may contain any number of individual modules. Furthermore, as shown in FIG. 3 each module 321-324 includes three superconducting processor chips, such as chips 341-343 (only called out for module 322). Those of skill in the art will appreciate that each module 321-324 may include any number of superconducting processor chips. For instance, each of modules 321-324 may approximate module 100 from FIG. 1, and thus each module 321-324 would include forty-eight superconducting processor chips. Similarly, as shown in FIG. 3 each superconducting processor chip, such as chips 341-343, includes three programmable superconducting devices such as devices A, B, C (only called out for chip 342). Those of skill in the art will appreciate that this is a simplification for the purposes of illustration, and in practice a superconducting processor chip may include any number of superconducting programmable devices.

The illustrative embodiment shown in FIG. 3 includes third-stage module router 302, second-stage chip routers 331-334, and first-stage device routers, such as device routers 351-353 (only called out for module 322). Routers 302, 331-334, and 351-353 may be superconducting packet routers. Using the routers, a communication protocol for programming system 300 may be implemented. Some embodiments of such a communication protocol may involve using a programmer/controller, such as programmer/controller 301, to define the signals used to program the programmable superconducting devices on the superconducting processor chips. Those of skill in the art will appreciate that programmer/controller 301 may take a variety of forms depending on the requirements of the system in which the communication protocol is being implemented. For instance, programmer/controller 301 may include at least one classical computing system operating at room temperature. The illustrative embodiment shown in FIG. 3 includes an exemplary signal path for the programming of a specific superconducting programmable device on a superconducting processor chip. The specific device being programmed in this example is device C on chip 342 in module 322. For the embodiment shown in FIG. 3, all potential signal paths are indicated by broken lines with directional arrowheads, while the exemplary signal path for the programming of specific superconducting programmable device C is indicated by the solid lines with directional arrowheads. In this example, a data signal that is established in programmer/controller 301 is sent to third-stage module router 302, which may read a portion of the signal to determine to which module 321-324 the signal is to be sent. Thus, third-stage module router 302 may receive a data signal from programmer/controller 301 and route the signal to the appropriate module (module 322 in this example). The data signal may then be received by second-stage chip router 332 in module 322, which may route the signal to the appropriate superconducting processor chip (chip 342 in this example). Similarly, the data signal may then be received by first-stage device router 352 on chip 342, which may route the signal to the appropriate superconducting programmable device, which is device C in this example. Thus, in FIG. 3 the exemplary signal path for the programming of a specific superconducting programmable device C represents a multi-stage communication path from programmer/controller 301 where the signal is generated or otherwise established, through third-stage module router 302 which routes the signal to module 322, through second-stage chip router 332 in module 322 which routes the signal to chip 342, through first-stage device router 352 on chip 342 which routes the signal to superconducting programmable device C. In this embodiment, superconducting programmable device C is then accordingly programmed by the data signal. Those of skill in the art will appreciate how other superconducting programmable devices in system 300 may similarly be programmed.

FIG. 3 is intended only for illustrative purposes of some embodiments of the present systems, methods and apparatus. Those of skill in the art will appreciate that the relative proximities of the components, their shapes and relative sizes, as well as their numbers may all vary depending on the exact nature of the system being implemented. In some embodiments any module 321-324 may include a base plate that is an MCM, and therefore the chip router and superconducting processor chips that correspond to a specific module may all be integrated on the same base plate. In other embodiments, any module 321-324 may incorporate at least one device that is not integrated on the base plate. Similarly, in some embodiments the device router that corresponds to each superconducting processor chip may be integrated into the same chip as the superconducting programmable devices to which it routes the signals. The illustrative superconducting processor chips in FIG. 3 are illustrated this way, with the device router that corresponds to each superconducting processor chip present on the chip itself. However, those of skill in the art will appreciate that, in other embodiments, the device routers may be positioned off-chip. Furthermore, the exact nature of the superconducting programmable devices, such as superconducting programmable devices A, B, and C from FIG. 3, may vary depending on the requirements of the system. For instance, superconducting programmable devices may be, but are not limited to, superconducting qubits, superconducting coupling devices, superconducting memory registers, and superconducting readout devices. In some embodiments, it may be advantageous for each device router to communicate with at least one on-chip memory register through which communication with the qubits and coupling devices may then be established.

In some embodiments of the present systems, methods and apparatus, the superconducting processor chips may include superconducting "on-chip" techniques for the local programming of superconducting processor elements. The local programming of the elements of a superconducting processor may be achieved using the systems and methods described in U.S. patent application Ser. No. 11/950,276. In various embodiments, such programming may incorporate the use of, for example, the digital-to-analog converters described in U.S. patent application Ser. No. 12/120,354, the superconducting demultiplexer circuits described in U.S. Provisional Patent Application Ser. No. 61/058,494, filed Jun. 3, 2008 and entitled "Systems, Methods And Apparatus For Superconducting Demultiplexer Circuits", known single flux quantum and quantum flux parametron shift registers, and/or the memory registers formed using latching qubits described in U.S. patent application Ser. No. 12/109,847. In some embodiments, at least one superconducting processor may include a superconducting quantum processor that comprises a plurality of superconducting qubits (e.g., superconducting flux qubits, superconducting charge qubits, superconducting phase qubits, and/or superconducting hybrid qubits) coupled by a plurality of programmable couplers In some embodiments of the present systems, methods and apparatus, the communication protocol for using superconducting packet routers to program the respective superconducting processors in a configuration of multiple superconducting processors involves a multi-stage communication network with at least one superconducting packet router acting as the intermediary between each stage. In such embodiments, each component in the multi-stage network may be assigned an address or an identification number. In an exemplary embodiment of a communication protocol, the initial data signal that is established in the programmer/controller, such as programmer/controller 301 in FIG. 3, may contain packets of information which may take the form:

[data|device#|chip#|module#]  (1)

where module # identifies the particular module to which the data signal is to be sent, chip # identifies the particular superconducting processor chip in module # to which the data signal is to be sent, device # identifies the particular superconducting programmable device on chip # to which the data signal is to be sent, and data represents the programming data that is to be communicated to device #. The exemplary data signal path (along the solid lines with directional arrowheads) in FIG. 3 serves as an illustrative embodiment of this exemplary communication protocol. A data signal of form (1) above may be established in programmer/controller 301 then sent to third-stage module router 302. Module router 302 then reads the module # data from the data signal, strips the module # data from the data signal, and routes the remaining data to the respective module that is identified by module #. Thus, data of the form:

[data|device#|chip#]  (2)

may be routed from third-stage module router 302 to second-stage chip router 332 in module 322, which in this example corresponds to the chip router in module #. Chip router 332 then reads the chip # data from the data signal, strips the chip # data from the data signal, and routes the remaining data to the superconducting processor chip in module # that is identified by chip #. Thus, data of the form:

[data|device#]  (3)

may be routed from second-stage chip router 332 in module 322 to first-stage device router 352 on chip 342, which in this example corresponds to the device router on chip #. Device router 352 then reads the device # data from the data signal, strips the device # data from the data signal, and routes the remaining data to the superconducting programmable device on chip # that is identified by device #. Thus, data of the form:

[data]  (4)

may be routed from device router 352 on chip 342 to superconducting programmable device C on chip 342, which in this example corresponds to device #.

Those of skill in the relevant art will appreciate that a number of alterations to the exemplary communication protocol described above may be implemented depending on the requirements of the system. For instance, in some embodiments the entirety of the routing requirements may be accomplished by one central first-stage router that is in direct communication with each superconducting programmable device on each superconducting processor chip in each individual module. In such a single-stage network protocol embodiment, data signals of the form (3) above may be established in the programmer/controller, received by the central router in form (3), and routed directly to the appropriate superconducting programmable device in form (4) above. However, in some embodiments it may be advantageous to implement a multi-stage network protocol in order to reduce or eliminate the need for each individual superconducting programmable device to have a unique communication line to a central router. Furthermore, some embodiments of the present systems, methods and apparatus may incorporate memory registers and or demultiplexer circuits on the superconducting processor chips which may be programmed in such a way that eliminates the need for the device # identifiers in data signal form (1). For instance, a memory register and the corresponding data signal may be sufficiently long (that is, of a sufficient number of bits of information) that the data for more than one superconducting programmable device may be transmitted through a single memory register. In such embodiments, the data for more than one superconducting programmable device may be contained in one data signal, and the initial data signal may be programmed in the form:

[data|module#|chip#|register#] (5)

where register # is only required if chip # includes more than one memory register, and the number of required register # values will be less than the number of superconducting programmable devices available. Similarly, those of skill in the art will appreciate that there are many other alterations that may be applied to the communication protocol to accommodate the needs of a specific system implementation. However, the present systems, methods and apparatus represent the first description of a network protocol (be it single- or multi-staged) for programming multiple superconducting processor chips using one or more superconducting packet routers.

In one aspect, the present systems, methods and apparatus describe the use of a superconducting packet router to program a plurality of devices on a superconducting processor chip. This embodiment corresponds to a system comprising a single superconducting processor chip and a corresponding device router. Thus, data of form (3) may be established in a programmer/controller and sent to the device router. The device router then reads the device # data from the data signal, strips the device # data from the data signal, and routes the remaining data of form (4) to the superconducting programmable device on the chip that is identified by device #.

As previously discussed, in some embodiments the initial data signal may be programmed by a programmer/controller system, such as programmer/controller 301 in FIG. 3, which may include at least one classical computer system. In some embodiments, the programming of each individual superconducting programmable device on a superconducting processor chip, such as devices A-C on chip 342 in FIG. 3, may be accomplished by manually defining the programming signals using a programmer/controller system such as programmer/controller 301. In other embodiments, the programming of each individual superconducting programmable device on a superconducting processor chip, such as devices A-C on chip 342 in FIG. 3, may be generated automatically by running an algorithm or program using a programmer/controller system such as programmer/controller 301.

The present systems, methods and apparatus may include a variety of different signal forms and corresponding signal transfer media. For instance, the superconducting processors themselves are superconducting and therefore operate on superconducting signals. These signals may be administered in a variety of forms including but not limited to: superconducting currents, superconducting voltages, and magnetic flux signals. A superconducting processor may be located on a superconducting processor chip, and in some embodiments multiple superconducting processors may be integrated on a MCM base plate. In such embodiments, each superconducting processor may include a plurality of input contact pads which may be coupled by, for example, galvanic coupling to the superconducting traces on the MCM. An MCM may also include a superconducting packet router with a corresponding set of output contact pads which may also be coupled by, for example, galvanic coupling to the superconducting traces on the MCM. Therefore, in some embodiments of the present systems, methods and apparatus there may be galvanic coupling between a superconducting packet switch and an MCM, where superconducting output signals travel from output contact pads on the superconducting packet router, through the MCM, to input contact pads on at least one superconducting processor. In some embodiments, a superconducting processor chip may itself be a MCM upon which multiple devices are integrated.

As indicated in FIG. 3, in some embodiments each superconducting processor chip may include a first-stage superconducting packet router, referred to as a "Device Router" in FIG. 3. As also shown in FIG. 3, a device router may receive a signal as routed from a second-stage "Chip Router." Communication between a chip router and a device router may be through superconducting signal lines and the communication signals may be superconducting signals. In such embodiments, the chip routers may also be refrigerated and they may be contained in the same refrigeration system as the individual modules. In other embodiments, within a module a chip router may be integrated on a base plate with a corresponding set of superconducting processor chips and their respective superconducting device routers. As previously discussed, in some embodiments a base plate may be a MCM or PCB with superconducting traces for communication between a chip router and a respective set of device routers.

Furthermore, each chip router may also be in communication with at least one central third-stage "Module Router" as indicated in FIG. 3. Communication between a module router and each of the chip routers may be through superconducting signal lines and the communication signals may be superconducting signals. In such embodiments, the at least one module router may also be refrigerated and included in the same refrigeration system as the chip routers. Thus, in some embodiments of the present systems, methods and apparatus, a room temperature electronic signal may be filtered into a refrigerated environment where it is converted into a superconducting signal and routed through a series of superconducting packet routers. Further detail on the filtering of such signals may be found in U.S. patent application Ser. No. 12/016,801 and U.S. Provisional Patent Application Ser. No. 61/080,997. However, in some embodiments of the present systems, methods and apparatus it may be advantageous to use other signal types and other signal media at various stages in the communication path between the programmer/controller and at least one superconducting processor. For instance, due to their high signal transfer rates it may be advantageous to use digital optical signals at various stages in the communication path between the programmer/controller and at least one superconducting processor. In some embodiments, communication between the programmer/controller and the at least one module router may be established using a digital optical signal through at least one fiber-optic cable. The module router may then convert the digital optical signal into a superconducting signal, in which case the module router may be a superconducting packet router which must be refrigerated and the module router may be included in the same refrigeration system as the modular system. In other embodiments, the module router may be an optical signal router and the optical signal may be routed through at least one fiber-optic cable from the module router to a corresponding chip router. The corresponding chip router may then convert the digital optical signal into a superconducting signal, in which case the corresponding chip router may be a superconducting packet router which must be refrigerated and may be included in the same refrigeration system as the modules. In other embodiments, the corresponding chip router may be an optical signal router and the optical signal may be routed through at least one fiber-optic cable to a corresponding device router. The corresponding device router may then convert the optical signal into a superconducting signal, in which case the corresponding device router may be a superconducting packet router which must be refrigerated and may be included in the same refrigeration system as the modules. In embodiments that use optical signal routers (or any other form of non-superconducting signal router), it may not be necessary to refrigerate the signal routers. At any stage (according to the embodiment), a digital optical signal may be converted into an electrical signal by a variety of ways which would be understood in the art. One such way is to couple the digital optical signal into a doped semiconducting waveguide, where incoming light generates electron-hole pairs. This waveguide can be fabricated in proximity to superconducting structures which sense the electrical signals generated by this process and convert these to superconducting signals in the superconducting structures. Another approach to performing optical-to-superconducting signal conversion is to couple the light into a superconducting transition edge sensor, which then goes normal and generates a voltage pulse when the light hits a thin superconducting wire biased close to its critical current. It may be advantageous to replace any room-temperature electric signal transfer with digital optical signals because digital optical signals are capable of high transfer rates and may require less filtering. For instance, if a digital optical signal with a transfer rate of 40 gigabits/second is used, the time it may take to reprogram every element of each of the superconducting processors may be $2.5 \times 10^{-11}$ seconds per number of superconducting processors per number of superconducting programmable devices per number of data bits. In an embodiment with 128 superconducting processors, 114,688 superconducting programmable devices, and using 40-bit signal packets, it may therefore take only about 15 milliseconds to reprogram every element of each of the superconducting processors.

Figure 4:
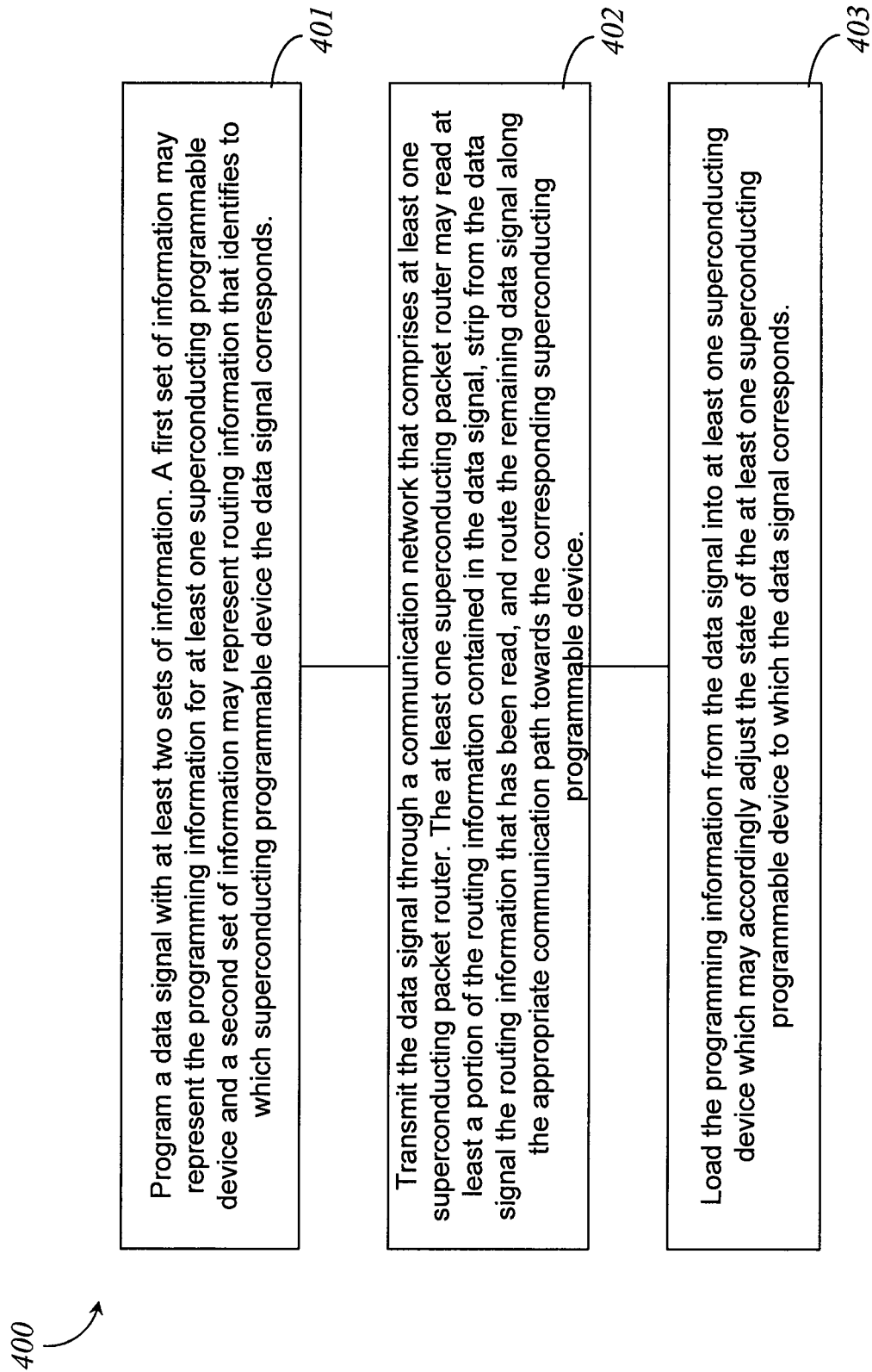
FIG. 4 is a flow-diagram that illustrates an embodiment of a method for programming the superconducting programmable devices in a computer system that comprises at least one superconducting processor.

The present systems, methods and apparatus describe a configuration of multiple superconducting processors and a corresponding technique for programming the various devices within a configuration of multiple superconducting processors. FIG. 4 illustrates an embodiment of a method 400 for programming the superconducting programmable devices in a computer system that comprises multiple superconducting processors. Method 400 includes three acts 401-403, though those of skill in the art will appreciate that any number of additional acts may be completed in between each of acts 401-403 depending on the specific requirements of the system in which multiple superconducting processors are being implemented. In act 401, a data signal is programmed with at least two sets of information. A first set of information may represent the programming information for at least one superconducting programmable device and a second set of information may represent routing information that identifies to which superconducting programmable device the data signal corresponds. In some embodiments, this programming may be completed using a programmer/controller such as programmer/controller 301 from FIG. 3. In act 402, the data signal is transmitted through a communication network that comprises at least one superconducting packet router. The at least one superconducting packet router may read at least a portion of the routing information contained in the data signal, strip from the data signal the routing information that has been read, and route the remaining data signal along the appropriate communication path towards the corresponding superconducting programmable device. In some embodiments, at least one superconducting packet router may be at least one of a third-stage module router such as module router 302 in FIG. 3, a second-stage chip router such as chip router 332 in FIG. 3, or a first-stage device router such as device router 352 in FIG. 3. In various embodiments of a multi-stage communication network similar to that shown in FIG. 3, the module, chip, and device routers may be referred to as third-stage, second-stage, and first-stage routers, respectively. Those of skill in the art will appreciate that a communication network using any number of stages may be implemented. For instance, a two-stage network may be implemented in which the module router is omitted and multiple chip routers are connected to the programmer/controller. Another example of a two-stage network is one in which the device routers are omitted and each superconducting programmable device has at least one signal line leading to a respective chip router. Those of skill in the art will appreciate that similar modifications may be made to any multi-stage communication network design. Furthermore, transmission through the various stages of a mutli-stage communication network may be accomplished through a variety of different media. For instance, at least a portion of the transmission of a data signal through a communication network described in act 402 may be in the form of an electrical signal, a superconducting signal, or a digital-optical signal through at least one fiber-optic cable.

In act 403, the programming information from the data signal is loaded into at least one superconducting device which may accordingly adjust the state of the at least one superconducting programmable device to which the data signal corresponds. In some embodiments, the superconducting device into which the programming information of the data signal is loaded may be the superconducting programmable device itself. In other embodiments, the superconducting device into which the programming information of the data signal is loaded may be a superconducting memory register, such as but not limited to a single flux quantum shift register, a flux-based shift register comprised of latching qubits, or a quantum flux parametron shift register. The programming information from the data signal may be loaded into a superconducting memory register and then relayed to at least one superconducting programmable device from the superconducting memory register.

A further aspect of the present systems, methods and apparatus is the readout of the superconducting processor devices. In some embodiments, communication of readout signals may follow a path that is the reverse of the programming path. That is, the state of a superconducting device may be read and represented by a superconducting signal in a readout register. This superconducting signal may then be transferred from the readout register to the device router corresponding to the particular superconducting processor chip upon which the device being read is located. From the device router, the signal may be transferred to the chip router that corresponds to the particular module within which the particular superconducting processor chip is located. From the chip router, the signal may be transferred to a central module router. And from a central module router, the signal may be transferred to the programmer/controller which may be capable of reading and operating upon the signal to administer the information according to the needs of the particular system.

The present systems, methods and apparatus describe a modular design for configurations of multiple superconducting processors and a network protocol for the programming of configurations of multiple superconducting processors using one or more superconducting packet routers. The network protocol may include a multi-stage network. However, as previously discussed in some embodiments it may be advantageous to circumvent one or more of the network stages drawn in FIG. 3. For instance, the device routers may be omitted by communicating directly from the chip routers to the superconducting programmable devices. Embodiments in which at least one network stage is removed may require larger routing devices and a greater number of communication paths to/from at least some of the routing devices. Some embodiments of the present systems, methods and apparatus describe the programming of on-chip memory in a superconducting processor chip using at least one superconducting packet router. Furthermore, some embodiments describe the coupling of at least one superconducting packet router to an MCM, where output signals travel through the MCM to input contact pads on multiple superconducting processors.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other superconducting computing systems, methods and apparatus, not necessarily the exemplary systems, methods and apparatus for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to: U.S. Provisional Patent Application Ser. No. 60/957,127, filed Aug. 21, 2007, entitled "Systems, Methods and Apparatus for Programming the Elements of Superconducting Processors"; U.S. Pat. Nos. 6,838,694; 7,335,909; US Patent Publication No. 2006-0225165; U.S. patent application Ser. No. 12/013,192; U.S. Provisional Patent Application Ser. No. 60/986,554 filed Nov. 8, 2007, entitled "Systems, Devices and Methods for Analog Processing"; U.S. Provisional Patent Application Ser. No. 61/039,710, filed Mar. 26, 2008, entitled "Systems, Devices, And Methods For Analog Processing"; US Patent Publication No. 2006-0147154; U.S. patent application Ser. No. 12/017,995; U.S. Provisional Patent Application Ser. No. 61/025,243, filed Jan. 31, 2008, entitled "Magnetic Vacuum Systems and Devices for use with Superconducting Based Computing Systems"; U.S. Provisional Patent Application Ser. No. 60/984,321, filed Oct. 31, 2007, entitled "Systems, Methods and Apparatus for Combined Superconducting Magnetic Shielding and Radiation Shielding"; U.S. Provisional Patent Application Ser. No. 60/981,763, filed Oct. 22, 2007, entitled "Systems, Methods and Apparatus for Superconducting Magnetic Shielding"; U.S. patent application Ser. Nos. 11/950,276; 12/120,354; U.S. Provisional Patent Application Ser. No. 61/058,494, filed Jun. 3, 2008, entitled "Systems, Methods And Apparatus For Superconducting Demultiplexer Circuits"; U.S. patent application Ser. Nos. 12/109,847; 12/016,801; and U.S. Provisional Patent Application Ser. No. 61/080,997 filed Jul. 15, 2008, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer system comprising:
a first superconducting processor chip that includes a first set of superconducting programmable devices;
a data programming system for establishing data signals wherein a data signal includes programming information for at least one superconducting programmable device and routing information that identifies to which superconducting programmable device the data signal corresponds;
a communication network that establishes a communication path between the data programming system and at least one of the superconducting programmable device from the first set of superconducting programmable devices; and
a first first-stage router that interrupts the communication path between the data programming system and the at least one superconducting programmable device from the first set of superconducting programmable devices.

2. The computer system of claim 1 wherein the superconducting processor chip includes a superconducting quantum processor and at least one of the superconducting programmable devices is selected from the group consisting of: a superconducting flux qubit, a superconducting phase qubit, a superconducting charge qubit, a superconducting hybrid qubit, a superconducting memory register, a single flux quantum shift register, a quantum flux parametron device, and a superconducting coupling device.

3. The computer system of claim 1 wherein the communication path between the first first-stage router and the at least one superconducting programmable device is interrupted by a superconducting memory register which receives a data signal from the first first-stage router and loads the data signal into the corresponding superconducting programmable device.

4. The computer system of claim 3 wherein at least one superconducting memory register is selected from the group consisting of: a single flux quantum shift register, a flux-based shift register comprising latching qubits, and a quantum flux parametron shift register.

5. The computer system of claim 1 wherein the first first-stage router is a superconducting packet router.

6. The computer system of claim 5 wherein the first first-stage router is integrated on the first superconducting processor chip and communication paths between the first first-stage router and the first set of superconducting programmable devices are superconducting.

7. The computer system of claim 1, further comprising:
a second superconducting processor chip that includes a second set of superconducting programmable devices;
at least one additional communication path that establishes communication between the data programming system and at least one of the superconducting programmable devices from the second set of superconducting programmable devices; and
a second first-stage router that interrupts the communication path between the data programming system and the at least one superconducting programmable device from the second set of superconducting programmable devices.

8. The computer system of claim 7, further comprising a first second-stage router that interrupts the communication paths between the data programming system and the first and the second first-stage routers.

9. The computer system of claim 8 wherein the first second-stage router is a superconducting packet router and the communication paths between the first second-stage router and each of the first and the second first-stage routers are superconducting.

10. The computer system of claim 8 wherein the first second-stage router is an optical router and at least one communication path between the data programming system and the first second-stage router and at least one of the communication paths between the first second-stage router and each of the first and the second first-stage routers are optical signal paths.

11. The computer system of claim 8 wherein the first and the second superconducting processor chips are both disposed on a first base plate.

12. The computer system of claim 11 wherein the first and the second first-stage routers are both disposed on the first base plate.

13. The computer system of claim 11 wherein the first base plate includes a superconducting multi-chip module and at least a portion of communication on the first base plate is through superconducting traces.

14. The computer system of claim 11 wherein the first base plate is circular in geometry.

15. The computer system of claim 11 wherein the first second-stage router is also disposed on the first base plate.

16. The computer system of claim 11, further comprising:
a second base plate upon which is disposed at least one superconducting processor chip that includes an additional set of superconducting programmable devices;
at least one additional communication path that establishes communication between the data programming system and at least one superconducting programmable device on the second base plate;
at least one additional first-stage router that interrupts a communication path between the data programming system and at least one superconducting programmable device on the second base plate; and
a second second-stage router that interrupts a communication path between the data programming system and the at least one additional first-stage router.

17. The computer system of claim 16 wherein the second base plate is stacked on top of the first base plate.

18. The computer system of claim 16, further including a third-stage router that interrupts the communication paths between the data programming system and the first and the second second-stage routers.

19. The computer system of claim 18 wherein the third-stage router is a superconducting packet router and the communication paths between the third-stage router and each of the first and the second second-stage routers are superconducting.

20. The computer system of claim 18 wherein the third-stage router is an optical router and at least one communication path between the data programming system and the third-stage router and at least one of the communication paths between the third-stage router and each of the first and the second second-stage routers are optical signal paths.

21. The computer system of claim 10, further including at least one optical-to-electrical signal converter.

22. The computer system of claim 16, further comprising:
at least one additional base plate upon which is disposed at least one superconducting processor chip;
at least one additional communication path that establishes communication between the data programming system and at least one superconducting programmable device on the at least one additional base plate;
at least one additional first-stage router that interrupts a communication path between the data programming system and at least one superconducting programmable device on the at least one additional base plate;
at least one additional second-stage router that interrupts a communication path between the data programming system and the at least one additional first-stage router; and
at least one additional second-stage router that interrupts the communication paths between the data programming system and the at least one additional first-stage router.

23. The computer system of claim 22 wherein at least two base plates are stacked one on top of the other.

* * * * *